April 16, 1940.   M. C. MEYER   2,197,345
DENTAL FLOSS HOLDER
Filed Oct. 8, 1938   2 Sheets-Sheet 2
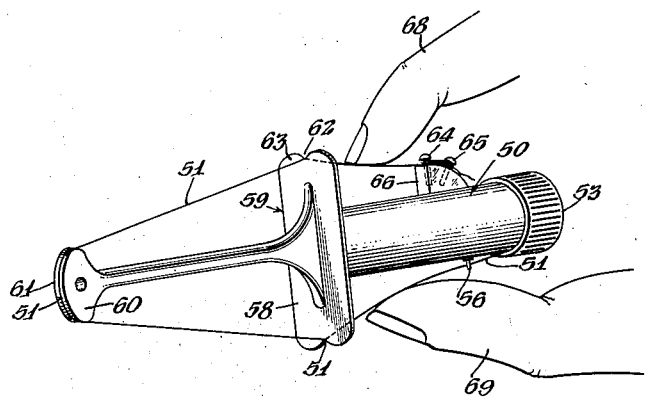
Fig. 6
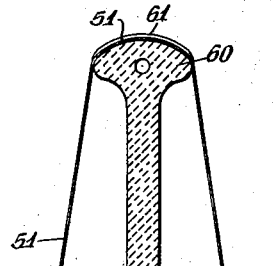
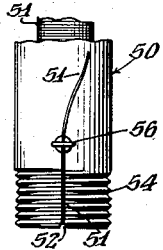
Fig. 10
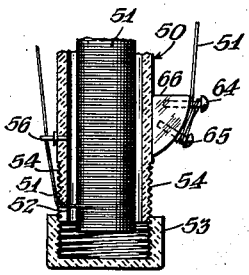
Fig. 8
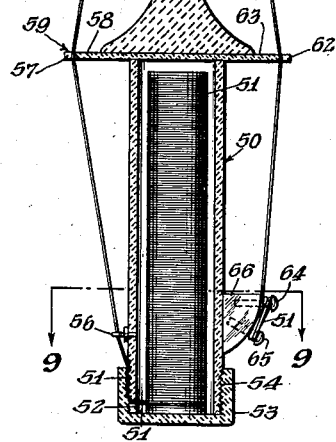
Fig. 7
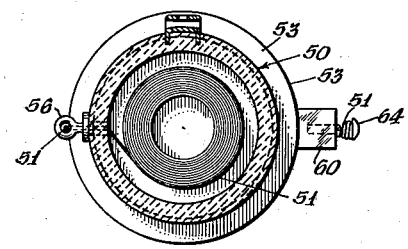
Fig. 9
INVENTOR.
Maximilian C. Meyer
BY Ostrolenk & Greene
ATTORNEYS Patented Apr. 16, 1940

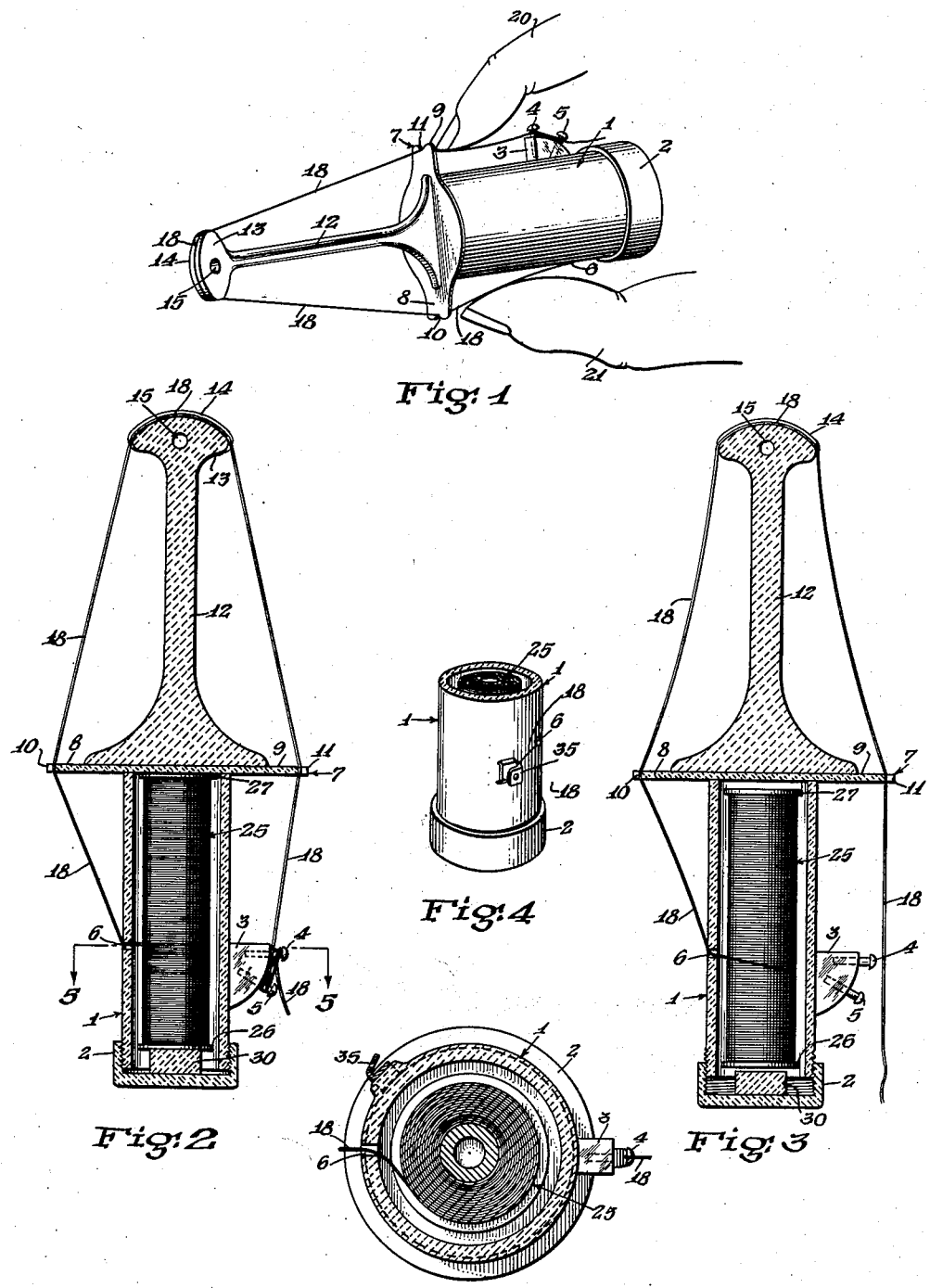

2,197,345

UNITED STATES PATENT OFFICE 2,197,345

DENTAL FLOSS HOLDER

Maximilian C. Meyer, Brooklyn, N. Y.

Application October 8, 1938, Serial No. 233,921

10 Claims. (Cl. 132—92)

My invention relates to a novel dental floss holder and more particularly it relates to an instrument comprising a container for supply of dental floss and an integral arm structure adapted to hold dental floss in operative relation in such a manner that constant and uniform working tension can be exerted upon the dental floss.

The advantages of using dental floss are well known. Proper dental hygiene necessitates cleansing of the proximal surfaces of the teeth which may be accomplished only by the action of dental floss correctly manipulated between the teeth. But the effective use of dental floss in the mouth is a difficult procedure when attempted with the fingers and, in the case of the posterior teeth, it is a practical impossibility for many people to manipulate dental floss by finger action to cleanse the inter-proximal surfaces of teeth in those areas.

The proper use of dental floss requires that it be manipulated in a straight line direction and that it penetrate completely throughout the interproximal surfaces of the teeth. Because of the shape of the oral cavity and the size of the fingers with respect to the mouth, it is often difficult to effectively work the floss within the mouth.

There have been many attempts in the prior art to provide an instrument for holding dental floss in such a manner that it can be properly used for cleansing the inter-proximal surfaces of both the anterior and posterior teeth. But most of these dental floss holders, although they properly spaced the dental floss across two supporting arms and rigidly secured the floss in place, were completely unsuccessful because they failed to solve the problem that is peculiar to dental floss, namely the slackening or loosening of the dental floss itself during its use. More specifically, the dental floss comprising as it does a waxed thread, has a tendency during its use to extend in a longitudinal direction so that, although these holders initially maintained the dental floss in a taut condition, after a few strokes with the floss, it had loosened to such an extent that it was not properly supported by the arms and hence could not be used at all.

The closest approach to solving this problem was made in such patents as No. 1,158,890 and 1,623,231 to Bowling and No. 1,700,550 to Stafford who show means for initially anchoring the dental floss across supporting arms and then tensioning the dental floss to obtain the maximum tension and firmly setting it in place. Thus the dental floss is initially maintained in the proper condition. However, as pointed out above, the problem is not so much the original tensioning of the thread, but it is to maintain the thread in a constant and uniform tensioned condition. In spite of the elaborate machine parts which the above mentioned patentees show, they did not offer a solution to the very real problem of not only initially providing a tensioned dental floss but uniformly and constantly maintaining it in a tensioned condition while in use. Because of this failure the dental floss holders of the prior art were without practical utility and there are none on the market today.

I have devised a novel dental floss holder that for the first time provides means for constantly and uniformly maintaining the dental floss in an extended tensioned condition. My dental floss holder further provides such an arm structure for holding the dental floss so that two strands of dental floss under constant tension are always presented for utility. This is an added advantage because it eliminates necessity for restringing the holder with fresh dental floss while cleaning the teeth. The closest suggestion to this construction is shown in the patent to Ladwig, No. 1,955,428, but the dental floss holder there shown is radically different in that it provides two strands which are to be bitten upon and the strands are therefore in parallel relation and are spaced one from the other so that by biting upon the strands simultaneously with the teeth, the cleansing can be effected. As will be more specifically shown hereinafter, my two strands are in triangular relationship coming to approximately a point at one end so that the strands may be properly introduced into the mouth for the transverse movement of the supported floss in accordance with the normal recommended use of dental floss.

By means of this extended member with transverse side arms, my floss holder always presents two working lengths of floss in operative condition. This is a decided advantage over the prior art because normally in flossing the teeth one strand is not enough and, in those holders which provide only a single working length, it is necessary to break off the floss and reset a new length which is a bother to the user. According to my invention, the two lengths provide sufficient floss for effectively flossing all the teeth without restringing.

I wish to lay particular emphasis on the novel manner in which I provide constant tension on the floss during the use thereof so that the slack which necessarily occurs in the floss is instantly taken up so that the floss is always maintained in a taut condition during use. This constant tension is effected by spacing the floss from the body of the container so that when the container is gripped, the fingers simultaneously grip the dental floss below the transversely extending arms and press the floss down toward the body of the container. Because of this pressure of the dental floss above the transverse arms, that is in the two lengths of working floss, a constant pull or tension is exerted. It is because I extend the transversely extending arms beyond the width of the body of the container to such a distance that when the floss be pressed in towards the body of the container, it does not quite reach the container but is always, even when pressed, spaced therefrom. Thus constant tension is maintained on the working floss. Of course, after sufficient slack is taken up in the floss after it is used, it is immaterial whether or not the floss actually touches the side of the container since the finger pressure thereon is still sufficient to maintain the working length of floss under tension.

My dental floss holder further integrally provides a container adapted to hold a supply of dental floss which is drawn out in successive lengths across the arm structure as it is needed. I further provide braking mechanisms to rigidly hold the dental floss at its source of supply while it is being strung across the arms and to hold it there for use. My braking mechanisms, which will be more specifically shown and described hereinafter, comprise means for frictionally engaging the spool which carries the supply of dental floss in the container. A modification of this braking mechanism lies in engaging dental floss in a groove between two threaded members of the container of my dental floss holder. A more specific reference to the means I provide for exerting a constant and uniform tension upon the dental floss positioned across the arms will be set forth hereinafter in connection with the drawings setting forth my invention.

Embracing the broad principles of my invention, I have provided two different forms of dental floss holder, the first of which is adapted to contain the relatively large spool of dental floss commonly sold in drug stores. In this form the dental floss travels out through a hole in the side wall of the container and is braked by a friction means that engages and holds the spool that carries the dental floss. In the other form adapted to carry the relatively long and cheaper spool of dental floss sold in chain stores and drug stores, the dental floss passes out at the base of the container and is braked or anchored in position between the threads of the container and the engaging cap that screws on to the container.

It is an object of my invention to provide a novel dental floss holder of such construction as to have means for uniformly and constantly tensioning the floss carried by such holder.

Another object of my invention is to provide a dental floss holder for the dental floss and a single arm construction adapted to provide two operative strands of dental floss maintained in taut condition.

A further object of my invention is to provide a dental floss holder having a container for the dental floss, means for holding the dental floss on an arm to provide two strands in operative relation and a means for braking the dental floss while such strands are held in such operative position.

Still another object of my invention is to provide a dental floss holder having a container for the dental floss, means for holding the dental floss on an arm to provide two strands in operative relation, a means for braking the dental floss while such strands are held in such operative position, and means for uniformly and constantly tensioning the dental floss while it is held in its operative position.

Other objects will become apparent from the figures and descriptions as hereinafter set forth.

Referring now to the drawings, in Figure 1 I show a perspective of the dental floss holder of my invention with the dental floss strung in operative position.

Figure 2 shows a cross section of the dental floss holder of my invention showing the spool carrying the dental floss braked against movement.

Figure 3 is a cross section similar to Figure 2 but showing the spool carrying the dental floss free to move for re-threading the dental floss across the supporting arms.

Figure 4 is a perspective of a detail of the dental floss holder of my invention showing means for breaking off the dental floss.

Figure 5 is a cross section taken along the line 5—5 of Figure 2.

Figure 6 is a perspective of the dental floss holder of my invention showing the modified form wherein the thread passes out from the bottom of the container and is braked between the bottom of the container and the cap.

Figure 7 is a cross section of the dental floss holder of my invention shown in Figure 6.

Figure 8 is a detailed cross section of the bottom of the dental floss holder of Figure 6 showing the cap removed.

Figure 9 is a cross section taken along the line 9—9 of Figure 7.

Figure 10 is a plan view showing the path of the floss out of the bottom of the container through a positioning groove and over the thread where it is braked by the cap.

Referring now more specifically to the drawings, in Figure 1 I show the dental floss holder of my invention which structurally comprises a container 1 adapted to hold a supply of dental floss usually in the form of a spool of such material. Mounted on one end of the container 1 and in screw thread engagement therewith is a threaded cap 2 which has means, to be described in more detail hereinafter, for frictionally engaging the spool carrying the dental floss and thus exerting a braking action on the dental floss. Suitably mounted on the container 1 is a block 3 that carries engaging pins 4 and 5 around which the dental floss is wrapped and thus secured. The dental floss emerges from an opening 6 in the container 1 and passes about a suitable supporting structure now to be described.

Mounted on one end of the container 1 is a bridge member 7 which extends in the form of arms 8 and 9 having notches 10 and 11 therein. It is essential to my invention that these arms be spaced at a distance from the container for purposes to be set out more fully hereinafter. An arm 12 extends from the same end of the container 1 and terminates in an extended member 13 having a thread carrying groove 14 embedded therein. In the extended member 13 is an opening 15 by means of which the dental floss holder may be hung upon a hook when not in use.

A suitable quantity of dental floss 18 is withdrawn from a supply within the container 1 through the opening 6 until a sufficient length is available for its use as shown. Thereupon the threaded cap 2 is turned so as to frictionally engage the dental floss spool within the container 1 which serves to brake the dental floss and anchor it in position. Thereupon the dental floss 18 is strung about the support members in this wise. It is first passed over the notch 10 in the arm 8, then over the groove 14 in the extended member 13 and then over the notch 11 in the arm 9 and is finally secured in a taut condition about the securing pins 4 and 5 on the member 3. Although this initial tension thus secured is all that is necessary for the first few flossing operations, the dental floss, because of its inherent nature, is soon slackened, and for that reason, I provide for gripping the dental floss holder with the fingers 20 and 21.

Because of the bridge and space construction of arms 8 and 9 with relation to the container 1, the fingers exert a constant tension upon the particular portion of the dental floss gripped and, because there is freedom of movement of the dental floss in the notches 10 and 11, the dental floss between the extended member 13 and the arms 8 and 9 is correspondingly tautened and maintained under tension through the operation. Even though there be a substantial slackening of the dental floss, the dual gripping action of the fingers and consequent tensioning, uniformly and constantly maintains the dental floss in its proper operative position. Although only the thumb and index fingers are shown, it is to be noted that the dental floss holder is held not only by these two fingers but also by the adjacent middle finger, which in combination with these two fingers affords a firm and sufficient grip for proper manipulation of the dental floss holder in the mouth.

Referring now to Figures 2 and 3 I show a cross section of the dental floss holder exhibiting the relative positioning of the spool 25 carrying the dental floss in the container 1 with respect to the braking mechanism carried by the cap 2. In Figure 2 I show the dental floss maintained in its tensioned and anchored position ready for use, and in Figure 3 I show the position of the various elements when it is desired to use a new length of dental floss, that is, to restring the floss on the holder.

In Figure 2 I show the spool 25 carrying the dental floss with the rigidly maintained ends 26 and 27. Mounted on the threaded cap 2 and in rigidly secured relation therewith is a friction block 30 which frictionally contacts the end 26 of the spool 25 when the cap 2 is screwed up on the container 1. When the friction block 30 firmly frictionally engages the end 26, the spool is kept from rotation and the dental floss 18 is anchored in its particular position at this end. The dental floss is then wound around the arms as described above and secured over the engaging pins 4 and 5. After this section of dental floss has been used, and it is desired to remove it, the cap 2 is unscrewed with respect to the container 1 as shown in Figure 3 whereupon the friction block 30 is disengaged from the rigidly mounted end 26 of the spool 25 and the dental floss may be withdrawn by pulling the thread, thus causing rotation of the spool and release of the thread.

Referring now to Figure 4 I show a cutting member 35 in the form of a curved element having side cutting surfaces. The relative positioning of this cutting element with respect to the opening 6 is shown and this positioning is very important inasmuch as it is desirable that after the dental floss is used that it be cut off at a point close to its emergence from the container for sanitary purposes. Since the particular length of dental floss left after cutting will be positioned outside of the operative position in subsequent use, that is to be used about the securing pins, therefore, only clean dental floss will be used in the flossing operation.

In Figure 6 I show a modified form of my invention, which construction is more adapted to hold that form of dental floss in which the dental floss emerges from a hole in one end of its container. Practically speaking, this is the common type of inexpensive dental floss provided in a container in which an opening is made in the cap for withdrawal of the dental floss. The dental floss in this form customarily does not come on a spool but is merely in cylindrically wrapped form. Therefore, I provide a modified braking mechanism to frictionally engage the dental floss at its starting point.

For purposes of clear explanation Figures 6 and 7 shall be described together. The container 50 holds a supply of dental floss 51 which is wrapped in cylindrical form and which is drawn for use out of one end of the container 50 through a groove 52, shown in plan view in Figure 10. The floss 51 passes between the threaded interior of the cap 53 and the threaded end 54 of the container 50. When the cap engages the container 50 by only a few thread engagements, that is before it is fully screwed on, there is not sufficient friction to clamp the dental floss 51 and the dental floss can be drawn between the two members. This is because of the groove in the threaded end of the container which will be more particularly described later. When sufficient dental floss has been withdrawn for use as shown, the cap 53 is screwed tightly on to the container 50 so that there are a sufficient number of thread engagements with the dental floss to firmly anchor it against further movement. The dental floss then passes through the eyelet 56 mounted in the container 50 and then through the notch 57 in the arm 58 of the bridge 59. The dental floss then passes over the extension 60 through the groove 61 contained therein. From there it is passed through the notch 62 in the arm 63 of the bridge 59 and then to the securing pins 64 and 65 fixed in the block 66 mounted on the container 50. As in the operation described in connection with Figure 1, the fingers 68 and 69 grip the dental floss in its spaced relation from the container 50 and maintain it in a tensioned condition throughout its use.

It is important to note the dual function of the groove 52 shown in Figures 7, 8 and 10. The groove positions the thread in its exit from the container so that it is not displaced from its proper working line by the rotation of the cap 53, and, what is even more important, the groove permits the movement of the dental floss for restringing without entirely removing the threaded cap from its engagement with the container. That is, because of the fact that the floss emerges beyond the bottom threads of the container, the cap 53 may be in engagement with the container by means of a few threads of engagement without gripping the dental floss so as to impede its free movement. For the practical use of this article of my invention this is an important consideration since it simplifies its use and operation.

In Figure 8 I show the manner in which the container and cap are in engagement without impeding the movement of the thread or dental floss. The groove and its relation to the threaded bottom of the container is shown in elevation in Figure 10 and it is believed that its function is clear from the above explanation.

The construction above set forth is obviously capable of many modifications in effecting the final desirable result. I lay particular emphasis on the general principles of the simplified means I have shown for maintaining constantly a working tension on the dental floss in its working position. I further wish to point out the advantages of the use of the two lengths of dental floss in the triangular position shown in the drawings, which is accomplished by means of the laterally extending piece over which the dental floss passes and the narrow grooved terminus through which the dental floss passes. For effective use this makes available two lengths of dental floss in such position as to be easily operated in the mouth without obnoxious positioning of large parts. At the same time it makes available at one stringing sufficient dental floss for a complete flossing operation.

Further features reside in the simplified braking mechanisms which are essential for easy operation of a device of this nature and which are effective for the common supplies of dental floss as sold.

Although I have particularly described certain structures which embody the principles above set forth, I do not wish to be limited to such particular showing, but only by the appended claims.

I claim:

1. A floss holder comprising an operative handle adapted to be gripped and a bridge member mounted on said operative handle, said bridge member spacing said floss from said operative handle so that simultaneously said operative handle may be gripped for operation of said floss holder and finger pressure exerted on said spaced floss whereby tension may be constantly maintained upon said floss.

2. A floss holder comprising an operative handle adapted to be gripped, a floss supporting member mounted thereon and a bridge member mounted on said operative handle for spacing the floss from said handle whereby finger pressure may be exerted on said floss for taking up slack therein, and said operative handle simultaneously gripped.

3. A floss holder comprising an operative handle adapted to be gripped; an extended floss supporting member; and a bridge member mounted on said operative handle, said bridge member spacing said floss from said operative handle so that simultaneously said operative handle may be gripped for operation of said floss holder and finger pressure exerted on said spaced floss whereby tension may be constantly maintained upon said floss.

4. A floss holder comprising an operative handle adapted to be gripped; an extended floss supporting member carrying floss retaining means; and a bridge member mounted on said operative handle, said bridge member spacing said floss from said operative handle so that simultaneously said operative handle may be gripped for operation of said floss holder and finger pressure exerted on said spaced floss whereby tension may be constantly maintained upon said floss.

5. A floss holder comprising an operative handle adapted to be gripped and a bridge member mounted on said operative handle, said bridge member spacing said floss from each of two opposite sides of said operative handle so that simultaneously said operative handle may be gripped for operation of said floss holder and finger pressure exerted on said spaced floss whereby tension may be constantly maintained upon said floss.

6. A floss holder comprising an operative handle adapted to be gripped, said operative handle being hollow and constructed to contain a supply of dental floss, and a bridge member mounted on said operative handle, said bridge member spacing said floss from said operative handle so that simultaneously said operative handle may be gripped for operation of said floss holder and finger pressure exerted on said spaced floss whereby tension may be constantly maintained upon said floss.

7. A floss holder comprising an operative handle adapted to be gripped; means for engaging dental floss; and a bridge member mounted on said operative handle, said means for engaging the dental floss being spaced from said bridge member along said operative handle; said bridge member spacing said floss from said operative handle so that simultaneously said operative handle may be gripped for operation of said floss holder and finger pressure exerted on said spaced floss whereby tension may be constantly maintained upon said floss.

8. A dental floss holder comprising an operative handle adapted to be gripped, said handle being hollow and constructed to contain a supply of dental floss, an opening for withdrawing said dental floss from said operative handle, means for holding said supply of dental floss against movement within said handle, a dental floss supporting arm constructed to hold said dental floss in operative position, and a bridge member mounted on said operative handle, said bridge member spacing said floss from said operative handle, and a means for anchoring said dental floss in operative position to said operative handle so that simultaneously said operative handle may be gripped for operation of said floss holder and finger pressure exerted on said spaced floss whereby tension may be constantly maintained upon said floss.

9. A floss holder comprising an operative handle adapted to be gripped and a bridge member formed on said operative handle, said bridge member spacing said floss from said operative handle so that simultaneously said operative handle may be gripped for operation of said floss holder and finger pressure exerted on said spaced floss whereby tension may be constantly maintained upon said floss.

10. A floss holder comprising an operative handle adapted to be gripped; an extended floss supporting member; and a bridge member mounted on said operative handle, said bridge member spacing said floss from said operative handle so that simultaneously said operative handle may be gripped for operation of said floss holder and finger pressure exerted on said spaced floss whereby tension may be constantly maintained upon said floss, said operative handle comprising a container for dental floss, a braking mechanism for the dental floss to hold said dental floss against movement, said braking mechanism comprising a groove at the end of the container remote from said extended floss supporting member and a friction cap which engages the floss as it emerges from the container and through the groove, said groove positioning said floss in a predetermined path.

MAXIMILIAN C. MEYER.